United States Patent
He

[19]

[11] Patent Number: 5,534,951
[45] Date of Patent: Jul. 9, 1996

[54] OPTICAL ASSEMBLY FOR TELEVISION FRONT SCREEN

[75] Inventor: Kai S. He, Shi Zhen, China

[73] Assignee: Chung Kin Lo, Hong Kong

[21] Appl. No.: 211,937

[22] PCT Filed: Oct. 22, 1992

[86] PCT No.: PCT/GB92/01945

§ 371 Date: Aug. 17, 1994

§ 102(e) Date: Aug. 17, 1994

[87] PCT Pub. No.: WO93/08663

PCT Pub. Date: Apr. 29, 1993

[30] Foreign Application Priority Data

Oct. 23, 1991 [CN] China .................. 91221034.6

[51] Int. Cl.$^6$ .................. H04N 5/74; H04N 5/72; G02B 21/00; G02B 27/02
[52] U.S. Cl. .................. 348/832; 348/781; 348/789; 348/383; 359/611; 359/802; 359/457
[58] Field of Search .................. 348/36, 38, 42, 348/43, 44, 46, 49, 59, 756, 832, 838, 842, 383, 781, 783, 789; 359/802, 609, 610, 611, 457

[56] References Cited

U.S. PATENT DOCUMENTS

| 3,733,436 | 5/1973 | Rose | 348/842 |
|---|---|---|---|
| 4,051,535 | 9/1977 | Inglis . | |
| 4,309,074 | 1/1982 | Granieri, Jr. . | |
| 4,367,486 | 1/1983 | Eichenlaub | 348/46 |
| 4,475,126 | 10/1984 | Akins | 348/832 |
| 4,903,137 | 2/1990 | Wakasa . | |
| 4,963,959 | 10/1990 | Drewlo | 348/59 |
| 5,061,052 | 10/1991 | DeJesus | 359/742 |
| 5,291,297 | 3/1994 | Steinmeyer | 348/44 |

FOREIGN PATENT DOCUMENTS 9300832 4/1993 WIPO .

Primary Examiner—Edward L. Coles, Sr.
Assistant Examiner—Kimberly A. Williams
Attorney, Agent, or Firm—Leydig, Voit & Mayer

[57] ABSTRACT

An optical assembly device (10) for use in front of a television screen having a diagonal dimension of S, which optical assembly comprises four panels (12 to 15) connected together to form a hollow body (11) having a substantially rectangular open front side (16) of width W and the height H and a substantially rectangular open rear side (17) of width W' and height H', the separation between the front and rear sides (16 and 17) being D and the inner sides of the panels being reflective. The optical assembly (10) further comprises front and rear lenses (18 and 19) provided extending across the open front and rear sides (16 and 17), respectively, of the body (11), the front side of the rear lens (19) being reflective, wherein the dimensions are related according to the following formulae:

(1) $W = [1+(W'/H'-B)] \cdot W'$
(2) $H = [1+(W'/H'-B)] \cdot H'$
(3) $D = K \cdot S$ Where:
(i) $B = (\sqrt{5}-1)/2$
(ii) $0.1 < K < 0.2$.

19 Claims, 2 Drawing Sheets

OPTICAL ASSEMBLY FOR TELEVISION FRONT SCREEN

BACKGROUND OF THE INVENTION

The present invention relates to a television image processing device for use in front of a television screen to enhance the enjoyment of television watching.

SUMMARY OF THE INVENTION

According to the invention, there is provided a television image processing device for use in front of television screen having a diagonal dimension of S, which imaging processing device comprises four panels connected together to form a hollow body having a substantially rectangular open front side of width W and height H and a substantially rectangular open rear side of width W' and height H', the separation between the front and rear open sides being and the inner sides of the panels being reflective which image processing device further comprises front and lenses provided extending across the open front and rear sides, respectively, of the body the front side of the rear lens being reflective, wherein the dimensions are related according to the following formulae:

(1) $W=[1+(W'/H'-B)]\cdot W'$ (2) $H=[1+(W'/H'-B)]\cdot H'$ (3) $D=K\cdot S$

Where:

(i) $B=(\sqrt{5}-1)/2$ (ii) $0.1<K<0.2$

It is preferred that the front lens is a Fresnel lens.

Preferably, the front lens is curved.

In a preferred embodiment, the rear lens is planar.

In a specific construction, the dimensions of the rear side of the body are substantially equal to that of a said television screen.

The invention also provides a television set which incorporates such a television image processing device.

BRIEF DESCRIPTION OF THE DRAWINGS

The invention will now be more particularly described, by way of example, with reference to the accompanying drawings, in which.

DETAILED DESCRIPTION OF THE PREFERRED EMBODIMENT

Figure 1:
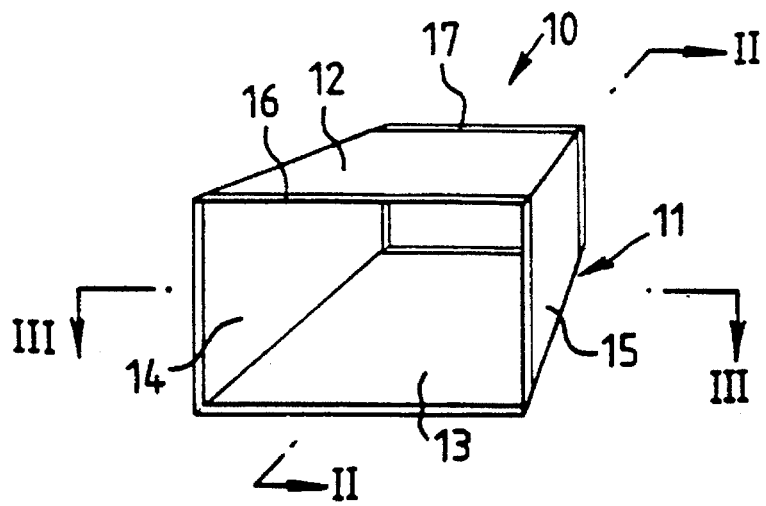
FIG. 1 is a front perspective view of an embodiment of a television image processing device in accordance with the invention.
Figure 2:
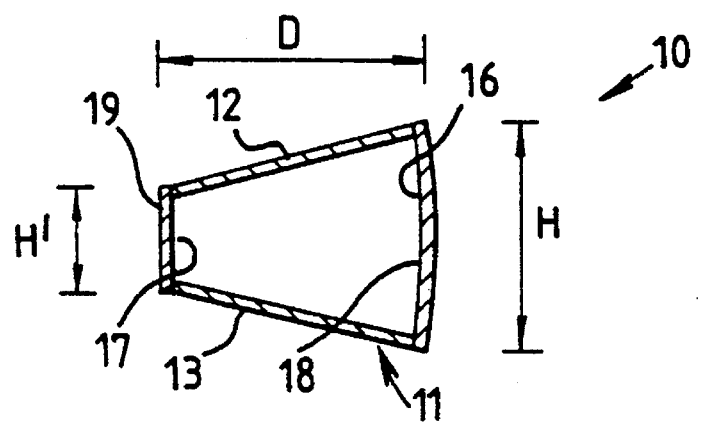
FIG. 2 is a sectional side view of the image processing device of FIG. 1.
Figure 3:
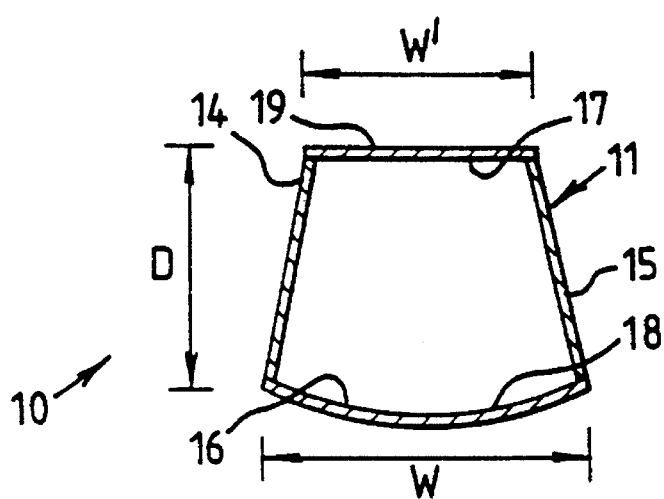
FIG. 3 is a sectional plan view of the image processing device of FIG. 2.

Referring to the drawings, there is shown a television image processing device 10 embodying the invention. The image processing device 10 comprises a hollow body 11 which is formed by four panels connected together, namely top panel 12, bottom panel 13 and two side panels 14 and 15, each having the shape of a symmetrical trapezium. The body 11 has a rectangular open front side 16 and a relatively smaller rectangular open rear side 17.

Extending across the open front end 16 of the body 11, there is provided a front lens 18 which is curved, being convex on the front side and concave on the rear side. The front lens 18 is preferably a Fresnel lens. A Fresnel lens is a generally known form of lens which has a surface comprising a plurality of smaller lenses or is constructed with stepped setbacks, usually but not necessarily circular. The open rear side 17 of the body 11 is occupied by a rear lens 19, extending there-across. The rear lens 19 is planar and has a reflective front side, but may be a curved lens.

Figure 4:
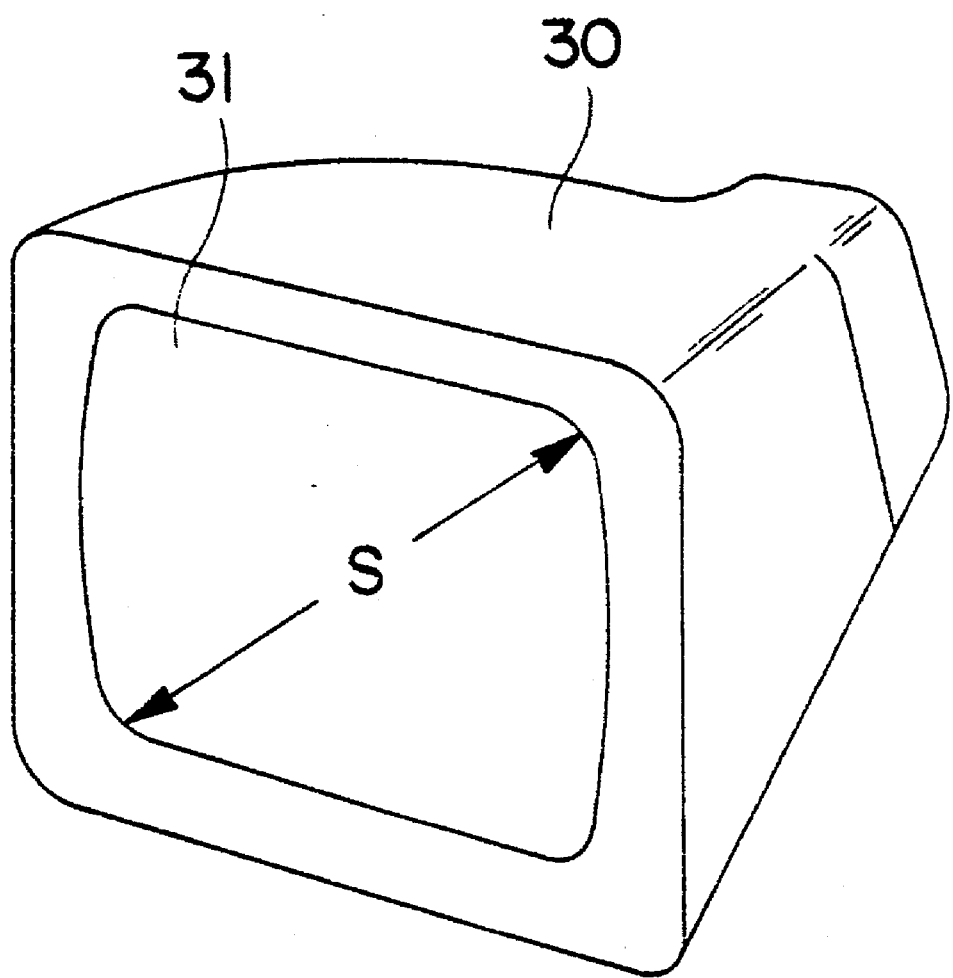
FIG. 4 is a front perspective view of a television set for use with the image processing device.

The image processing device 10 is to be used in front of the screen 31 of a television set 30. The television screen is generally rectangular and has a diagonal (corner-to-corner) dimension of S (See FIG. 4). The front side 16 of the body 11 of the image processing device 10 has a width of W and a height of H, whereas the rear side 17 has a width of W' and a height H'. The separation between the front and rear sides 16 and 17 of the body 11 has a measurement of D, that being the depth of the body 11.

The various dimensions or measurements are related according to the following formulae:

(1) $W=[1+(W'/h'-B)]\cdot W'$ (2) $H=[1+(W'/H'-B)]\cdot H'$ (3) $D=K\cdot S$

In the formulae, B denotes the golden coefficient having a value of $(\sqrt{5}-1)/2$ or about 0.618, and K denotes a constant having a value in the range between 0.1 and 0.2.

In this particular embodiment, the width W' and height H' of the rear side 17 of the body 11 of the image processing device 10 are chosen to be the same as the corresponding measurement of the television screen. As a result, the remaining dimensions of the body 11, namely the values of W, H and D, can be determined according to the above three formulae. It is, however, to be understood that the size of the body rear side 17 is not necessarily the same as that of the television screen, although the corresponding measurements are preferably in direct proportion.

Taking as an example, the television screen has a width of 512 mm (being the value of W') and a height of 385 mm (being the value of H'), and hence a diagonal measurement S of about 641 mm. The value of the constant K is chosen to be 0.152. According to the formulae, the width W and height H of the front side 16 of the body 11 of the image processing device 10 are calculated to be about 876 mm and 659 mm, respectively, and the depth D of the body 11 is about 97 mm.

Depending on the size of the television screen and the television watching distance, it is preferred that the focal length of the front lens 18 falls within the range of 200 mm to 400 mm and is more preferably 250 mm. Likewise, the depth D of the image processing device body 11 is preferably in the range of 50 mm to 150 mm.

In use, the image processing device 10 is positioned in front of the television screen, with the rear side 17 of the body 11 placed against or close to and aligned with the television screen. The use of the image processing device 10 will impart a certain degree of 3-dimensional quality to the television image passing through the device 10, as hereinbelow explained.

The television image travels through the image processing device 10 in the following three different paths:

1. The first path being from the television screen directly through the rear lens 19 and the front lens 18 to the viewer;

2. The second path being from the television screen through the rear lens 19 to the panels 12 to 15 and then reflected by the panels 12 to 15 to and through the front lens 18 to the viewer; and 3. The third path being from the television screen through the rear lens 19 to the panels 12 to 15, then reflected by the panels 12 to 15 back onto the front side of the rear lens 19 and finally reflected by the rear lens front side to and through the front lens 18 to the viewer.

By reason of the difference in travelling paths, the television image is subject to different actions of reflection, refraction and/or diffraction inside and through the body 11 of the described image processing device 10. The final television image is thereby made up of three components having different relative phase shifts and different angles of propagation. These television image components interact by way of optical interference and fall into slightly different vision areas, thereby producing a realistic 3-dimensional effect.

It is to be appreciated that the television image processing device of the invention will also absorb or filter away some of the undesirable or harmful radiations, such as X-rays, from the television image. In the described embodiment, the image processing device 10 will also provide an enlarged television image.

It is envisaged that the television image processing device of the invention may be provided as a separate (add-on) device or as an integral part of a television set.

The invention has been given by way of example only, and various modifications of and/or alterations to the described embodiment may be made by persons skilled in the art without departing from the scope of the invention as specified in the appended claims.

I claim:

1. A television image processing device for use in front of a television screen having a diagonal dimension of S, which imaging processing device comprises four panels connected together to form a hollow body having a substantially rectangular open front side of width W and height H and a substantially rectangular open rear side of width W' and height H', the separation between the front and rear open sides being D and the inner sides of the panels being reflective, which image processing device further comprises front and rear lenses provided extending across the open front and rear sides, respectively, of the body, the front side of the rear lens being reflective, wherein the dimensions are related according to the following formulae:

(1) $W = [1 + (W'/H' - B)] \cdot W'$ (2) $H = [1 + (W'/H' - B)] \cdot H'$ (3) $D = K \cdot S$ Where:

(i) $B = (\sqrt{5} - 1)/2$ (ii) $0.1 < K < 0.2$.

2. A television image processing device as claimed in claim 1 wherein the front lens is a Fresnel lens.

3. A television image processing device as claimed in claim 1 wherein the front lens is curved.

4. A television image processing device as claimed in claim 1 wherein the rear lens is planar.

5. A television image processing device as claimed in claim 1 wherein the dimensions of the rear side of the body are substantially equal to that of said television screen.

6. A television image processing device as claimed in claim 1 including a television coupled to the rear side.

7. A television image processing device for use in front of a television screen having a diagonal dimension S, the image processing device comprising four panels connected together to form a hollow body having a substantially rectangular open front side of width W and height H and a substantially rectangular open rear side of width W' and height H', the separation between the front and rear open sides being D and the inner sides of the panels being reflective; and a front lens extending across the open front side of the body, wherein the dimensions are related according to the following formulae:

(1) $W = [1 + (W'/H' - B)] \cdot W'$ (2) $H = [1 + (W'/H' - B)] \cdot H'$ (3) $D = K \cdot S$ Where:

(i) $B = (\sqrt{5} - 1)/2$ (ii) $0.1 < K < 0.2$.

8. A television image processing device as claimed in claim 7 including a rear lens disposed across the open rear side of the body, the front side of said rear lens being reflective.

9. A television image processing device as claimed in claim 8 including a television coupled to the rear side.

10. A television image processing device as claimed in claim 8 wherein the rear lens is planar.

11. A television image processing device as claimed in claim 8 wherein the front lens is a Fresnel lens.

12. A television image processing device as claimed in claim 8 wherein the front lens is curved.

13. A television image processing device as claimed in claim 8 wherein the dimensions of the rear side of the body are substantially equal to that of said television screen.

14. An image processing device for use in providing a three dimensional quality to an image generated by a television screen, the image processing device comprising a substantially rectangular box open at first and second ends, the first end being disposed adjacent to the television screen for receiving the image and the second end projecting the image outward, the substantially rectangular box having a diagonal dimension S, the first end substantially having a width W and height H and the second end substantially having a width W' and height H' a distance between the first and second ends being substantially D, wherein inner sidewalls of the substantially rectangular box are reflective, wherein S, H, W, W', H', and D are related according to the following:

(1) W is substantially $[1 + (W'/H' - B)] \cdot W'$ (2) H is substantially $[1 + (W'/H' - B)] \cdot H'$ (3) D is substantially $K \cdot S$ Where:

(i) B is substantially $(\sqrt{5} - 1)/2$ (ii) $0.1 < K < 0.2$.

15. A television image processing device as claimed in claim 14 including a curved front lens.

16. A television image processing device as claimed in claim 14 including a front lens disposed across the second end.

17. A television image processing device as claimed in claim 16 including a rear lens disposed across the first end, a first side of said rear lens being reflective.

18. A television image processing device as claimed in claim 14 including a planar rear lens.

19. A television image processing device as claimed in claim 15 including a Fresnel lens disposed in front of the substantially rectangular box.

* * * * *